(12) United States Patent
Kimura

(10) Patent No.: US 10,931,883 B2
(45) Date of Patent: Feb. 23, 2021

(54) ADJUSTING CAMERA EXPOSURE FOR THREE-DIMENSIONAL DEPTH SENSING AND TWO-DIMENSIONAL IMAGING

(71) Applicant: Magik Eye Inc., New York, NY (US)

(72) Inventor: Akiteru Kimura, Hachioji (JP)

(73) Assignee: MAGIK EYE INC., New York, NY (US)

( * ) Notice: Subject to any disclaimer, the term of this patent is extended or adjusted under 35 U.S.C. 154(b) by 0 days.

(21) Appl. No.: 16/353,859

(22) Filed: Mar. 14, 2019

(65) Prior Publication Data

US 2019/0297241 A1    Sep. 26, 2019

Related U.S. Application Data

(60) Provisional application No. 62/645,190, filed on Mar. 20, 2018.

(51) Int. Cl.
*H04N 5/235* (2006.01)
*H04N 13/289* (2018.01)
*H04N 13/254* (2018.01)

(52) U.S. Cl.
CPC ......... *H04N 5/2353* (2013.01); *H04N 13/254* (2018.05); *H04N 13/289* (2018.05)

(58) Field of Classification Search
CPC .... G01B 11/25; G01B 11/026; H04N 13/254; H04N 5/2353; H04N 13/289; H04N 9/315
See application file for complete search history.

(56) References Cited

U.S. PATENT DOCUMENTS

| | | | |
|---|---|---|---|
| 4,914,460 | A | 4/1990 | Caimi et al. |
| 5,699,444 | A | 12/1997 | Palm |
| 5,730,702 | A | 3/1998 | Tanaka et al. |
| 5,870,136 | A | 2/1999 | Fuchs et al. |
| 5,980,454 | A | 11/1999 | Broome |
| 6,038,415 | A | 3/2000 | Nishi et al. |
| 6,442,476 | B1 | 8/2002 | Poropat |
| 6,668,082 | B1 | 12/2003 | Davison et al. |

(Continued)

FOREIGN PATENT DOCUMENTS

| | | |
|---|---|---|
| CN | 101794065 A | 8/2010 |
| CN | 103196385 A | 7/2013 |

(Continued)

OTHER PUBLICATIONS

International Search Report and Written Opinion mailed in the corresponding PCT/US2019/022313 dated Jul. 2, 2019, 11 pages.

*Primary Examiner* — Obafemi O Sosanya
(74) *Attorney, Agent, or Firm* — Tong, Rea, Bentley & Kim, LLC

(57) ABSTRACT

An example method includes setting an exposure time of a camera of a distance sensor to a first value, instructing the camera to acquire a first image of an object in a field of view of the camera, where the first image is acquired while the exposure time is set to the first value, instructing a pattern projector of the distance sensor to project a pattern of light onto the object, setting the exposure time of the camera to a second value that is different than the first value, and instructing the camera to acquire a second image of the object, where the second image includes the pattern of light, and where the second image is acquired while the exposure time is set to the second value.

20 Claims, 10 Drawing Sheets

(56) References Cited

U.S. PATENT DOCUMENTS

| | | |
|---|---|---|
| 6,937,350 B2 | 8/2005 | Shirley |
| 7,191,056 B2 | 3/2007 | Costello et al. |
| 7,193,645 B1 | 3/2007 | Aagaard et al. |
| 7,375,803 B1 | 5/2008 | Bamji |
| 7,589,825 B2 | 9/2009 | Orchard et al. |
| 9,098,909 B2 | 8/2015 | Nomura |
| 9,488,757 B2 | 11/2016 | Mukawa |
| 9,686,539 B1 | 6/2017 | Zuliani et al. |
| 9,888,225 B2 | 2/2018 | Znamensky et al. |
| 9,986,208 B2 | 5/2018 | Chao et al. |
| 2003/0071891 A1 | 4/2003 | Geng |
| 2004/0167744 A1 | 8/2004 | Lin et al. |
| 2006/0044546 A1 | 3/2006 | Lewin et al. |
| 2006/0055942 A1 | 3/2006 | Krattiger |
| 2006/0290781 A1 | 12/2006 | Hama |
| 2007/0091174 A1 | 4/2007 | Kochi et al. |
| 2007/0165243 A1 | 7/2007 | Kang et al. |
| 2007/0206099 A1 | 9/2007 | Matsuo |
| 2010/0149315 A1 | 6/2010 | Qu et al. |
| 2010/0223706 A1 | 9/2010 | Becker et al. |
| 2010/0238416 A1 | 9/2010 | Kuwata |
| 2011/0188054 A1 | 8/2011 | Petronius et al. |
| 2012/0051588 A1 | 3/2012 | Mceldowney |
| 2012/0056982 A1* | 3/2012 | Katz ................. G06T 7/521 348/43 |
| 2012/0062758 A1 | 3/2012 | Devine et al. |
| 2012/0113252 A1 | 5/2012 | Yang et al. |
| 2012/0219699 A1 | 8/2012 | Pettersson |
| 2012/0225718 A1 | 9/2012 | Zhang |
| 2012/0236317 A1 | 9/2012 | Nomura |
| 2013/0088575 A1 | 4/2013 | Park et al. |
| 2013/0155417 A1 | 6/2013 | Ohsawa |
| 2013/0242090 A1 | 9/2013 | Yoshikawa |
| 2013/0307933 A1 | 11/2013 | Znamensky et al. |
| 2014/0000520 A1 | 1/2014 | Bareket |
| 2014/0009571 A1 | 1/2014 | Geng |
| 2014/0016113 A1 | 1/2014 | Holt et al. |
| 2014/0036096 A1 | 2/2014 | Sterngren |
| 2014/0071239 A1 | 3/2014 | Yokota |
| 2014/0085429 A1 | 3/2014 | Hérbert |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0012244 A1 | 1/2015 | Oki |
| 2015/0016003 A1 | 1/2015 | Terry et al. |
| 2015/0077764 A1 | 3/2015 | Braker et al. |
| 2015/0131054 A1 | 5/2015 | Wuellner et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2015/0323321 A1 | 11/2015 | Oumi |
| 2015/0336013 A1 | 11/2015 | Stenzier et al. |
| 2015/0381907 A1 | 12/2015 | Boetliger et al. |
| 2016/0022374 A1 | 1/2016 | Haider |
| 2016/0117561 A1 | 4/2016 | Miyazawa et al. |
| 2016/0128553 A1 | 5/2016 | Geng |
| 2016/0157725 A1 | 6/2016 | Munoz |
| 2016/0178915 A1 | 6/2016 | Mor et al. |
| 2016/0249810 A1 | 9/2016 | Darty et al. |
| 2016/0261854 A1 | 9/2016 | Ryu et al. |
| 2016/0267682 A1 | 9/2016 | Yamashita |
| 2016/0327385 A1 | 11/2016 | Kimura |
| 2016/0328854 A1 | 11/2016 | Kimura |
| 2016/0334939 A1 | 11/2016 | Dawson et al. |
| 2016/0350594 A1 | 12/2016 | McDonald |
| 2017/0098305 A1 | 4/2017 | Gossow |
| 2017/0102461 A1 | 4/2017 | Tezuka et al. |
| 2017/0221226 A1 | 8/2017 | Shen et al. |
| 2017/0270689 A1 | 9/2017 | Messely et al. |
| 2017/0284799 A1 | 10/2017 | Wexler et al. |
| 2017/0307544 A1 | 10/2017 | Nagata |
| 2017/0347086 A1 | 11/2017 | Watanabe |
| 2018/0010903 A1 | 1/2018 | Takao et al. |
| 2018/0011194 A1* | 1/2018 | Masuda ............ H04N 5/3696 |
| 2018/0073863 A1* | 3/2018 | Watanabe .......... G02B 27/283 |
| 2018/0080761 A1 | 3/2018 | Takao et al. |
| 2018/0143018 A1 | 5/2018 | Kimura |
| 2018/0156609 A1 | 6/2018 | Kimura |
| 2018/0227566 A1 | 8/2018 | Price et al. |
| 2018/0249142 A1 | 8/2018 | Hicks et al. |
| 2018/0324405 A1 | 11/2018 | Thirion |
| 2018/0329038 A1 | 11/2018 | Lin et al. |
| 2018/0357871 A1 | 12/2018 | Siminoff |
| 2019/0107387 A1 | 4/2019 | Kimura |
| 2019/0108743 A1 | 4/2019 | Kimura |
| 2019/0122057 A1 | 4/2019 | Kimura |
| 2019/0295270 A1 | 9/2019 | Kimura |
| 2019/0377088 A1 | 12/2019 | Kimura |
| 2020/0003556 A1 | 1/2020 | Kimura |
| 2020/0051268 A1 | 2/2020 | Kimura |
| 2020/0182974 A1 | 6/2020 | Kimura |
| 2020/0236315 A1 | 7/2020 | Kimura |

FOREIGN PATENT DOCUMENTS

| | | |
|---|---|---|
| CN | 103559735 A | 2/2014 |
| CN | 104160243 A | 11/2014 |
| EP | 0358628 A2 | 3/1990 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |
| JP | 4485365 B2 | 6/2010 |
| JP | 2010-256182 A | 11/2010 |
| JP | 2012-047500 A | 3/2012 |
| JP | 2014-020978 A | 2/2014 |
| JP | 2014-511590 A | 5/2014 |
| JP | 2014-122789 A | 7/2014 |
| JP | 6038415 B1 | 12/2016 |
| JP | 6241793 B2 | 12/2017 |
| KR | 10-2013-0000356 A | 1/2013 |
| KR | 10-2013-0037152 A | 4/2013 |
| KR | 10-2015-0101749 A | 9/2015 |
| KR | 10-2016-0020323 | 2/2016 |
| KR | 10-2017-0005649 A | 1/2017 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO/2013/145164 | 10/2013 |
| WO | WO 2014/0106843 A2 | 7/2014 |
| WO | WO 2014/131064 | 8/2014 |
| WO | WO 2015/166915 A1 | 11/2015 |

* cited by examiner

ADJUSTING CAMERA EXPOSURE FOR THREE-DIMENSIONAL DEPTH SENSING AND TWO-DIMENSIONAL IMAGING

CROSS REFERENCE TO RELATED APPLICATIONS

This application claims the priority of U.S. Provisional Patent Application Ser. No. 62/645,190, filed Mar. 20, 2018, which is herein incorporated by reference in its entirety.

BACKGROUND

U.S. patent application Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include projection systems (e.g., comprising lasers, diffractive optical elements, and/or other cooperating components) which project beams of light in a wavelength that is substantially invisible to the human eye (e.g., infrared) into a field of view. The beams of light spread out to create a pattern (of dots, dashes, or other artifacts) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

An example method includes setting an exposure time of a camera of a distance sensor to a first value, instructing the camera to acquire a first image of an object in a field of view of the camera, where the first image is acquired while the exposure time is set to the first value, instructing a pattern projector of the distance sensor to project a pattern of light onto the object, setting the exposure time of the camera to a second value that is different than the first value, and instructing the camera to acquire a second image of the object, where the second image includes the pattern of light, and where the second image is acquired while the exposure time is set to the second value.

In another example, a non-transitory machine-readable storage medium is encoded with instructions executable by a processor. When executed, the instructions cause the processor to perform operations including setting an exposure time of a camera of a distance sensor to a first value, instructing the camera to acquire a first image of an object in a field of view of the camera, where the first image is acquired while the exposure time is set to the first value, instructing a pattern projector of the distance sensor to project a pattern of light onto the object, setting the exposure time of the camera to a second value that is different than the first value, and instructing the camera to acquire a second image of the object, where the second image includes the pattern of light, and where the second image is acquired while the exposure time is set to the second value.

In another example, a distance sensor includes a pattern projector configured to project a pattern of light onto an object, a camera, a controller configured to set an exposure time of the camera to a first value when the pattern projector is not projecting the pattern of light onto the object and to set the exposure time of the camera to a second value when the pattern projector is projecting the pattern of light onto the object, and a processor configured to calculate a distance from the distance sensor to the object based on a first image captured when the exposure time is set to the first value and a second image captured when the exposure time is set to the second value.

DETAILED DESCRIPTION

Figure 1:
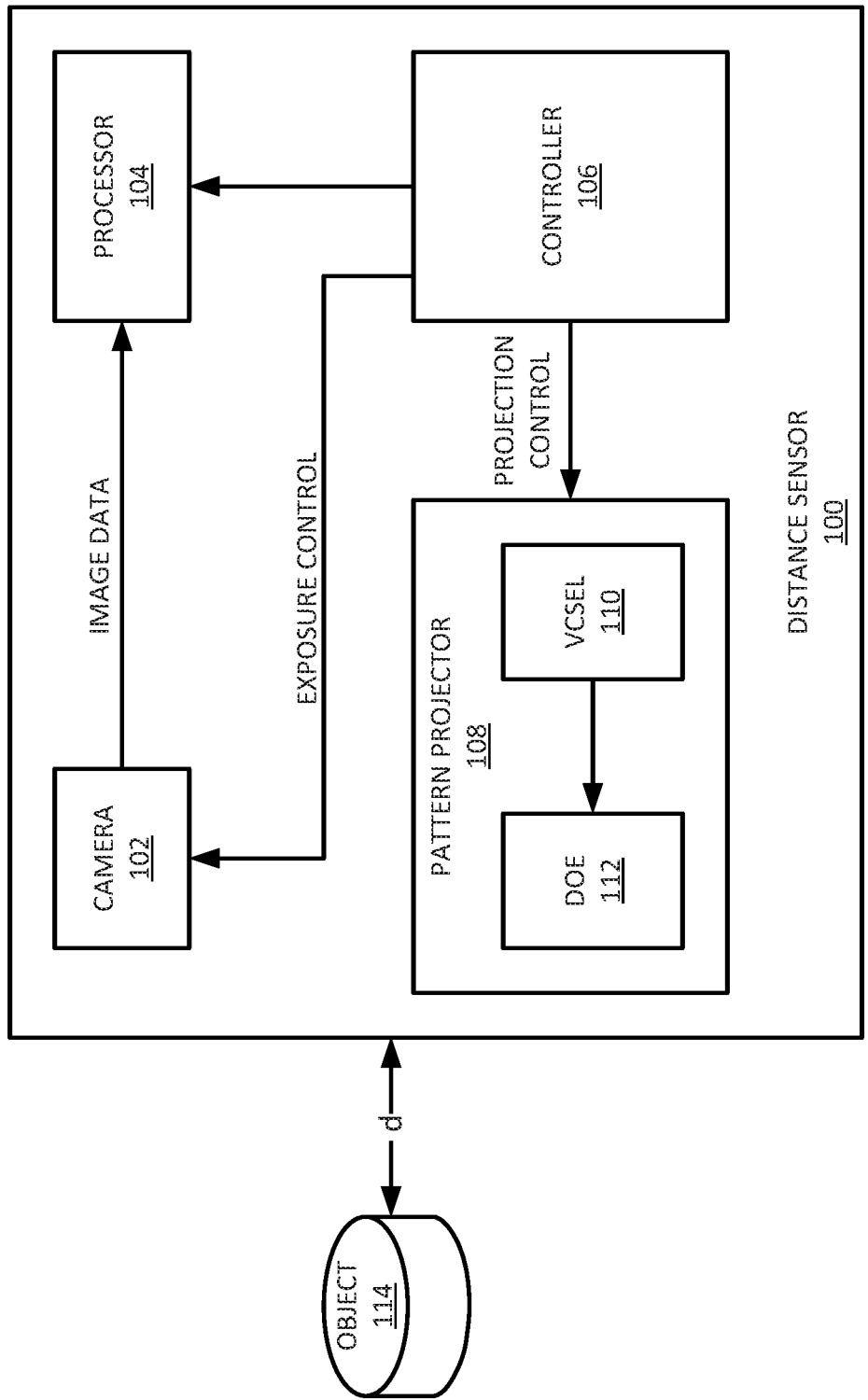
FIG. 1 is a block diagram illustrating an example distance sensor of the present disclosure.

The present disclosure broadly describes an apparatus, method, and non-transitory computer-readable medium for adjusting the camera exposure of a distance sensor for three-dimensional depth sensing and two-dimensional image capture. As discussed above, distance sensors such as those described in U.S. patent application Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. The beams of light may be projected from one or more laser light sources which emit light of a wavelength that is substantially invisible to the human eye, but which is visible to an appropriate detector (e.g., of the light receiving system). The three-dimensional distance to the object may then be calculated based on the appearance of the pattern to the detector.

In some cases, a two-dimensional image of the object may also be captured (e.g., by a camera of the light receiving system) and used to improve the three-dimensional distance measurement. For example, a reference mark may be affixed to the object. Then, when the available amount of three-dimensional information (e.g., number of dots of the pattern) is insufficient for making an accurate distance measurement, information from a two-dimensional image of the object (including the reference mark) may be used to supplement the three-dimensional information. It may also be possible to determine environmental characteristics such as external brightness, object reflectance, and the like from the two-dimensional image. This information may be used to adjust the projected beams (and, consequently, the projected pattern) to improve the three-dimensional distance measurement.

Various factors, however, make it difficult to acquire three-dimensional object data (e.g., including pattern data) and a two-dimensional object image in quick succession with the same camera. For instance, noise introduced by ambient light may make it difficult for the detector to clearly detect the pattern formed by the beams. One way to mitigate the effects of ambient light is to incorporate a narrow band-pass filter in the light receiving system of the sensor, e.g., where the filter allows only infrared light to pass. However, if the amount of ambient light is very great (such as might be the case outdoors), then the difference in brightness between the pattern and the ambient light may be very small. Moreover, if the exposure time of the light receiving system is not set appropriately, then the relationship between the exposure value and the sensor latitude may cause unwanted saturation. In either case, it may still be difficult for the detector to distinguish the pattern formed by the beams from the ambient light, even if a narrow band-pass filter is used. For example, when both the image of the pattern formed by the beams and the ambient light exceed the sensor latitude, saturation may occur. However, an image of the pattern may become clearer by reducing the exposure time so that the amount of light input to the light receiving system is within the range of the sensor's latitude.

Alternatively or in addition, when the amount of ambient light is great, the pattern may be easier for the detector to distinguish if the brightness of the beams that form the pattern is increased relative to the brightness of the ambient light. However, from a safety perspective, increasing the brightness of the beams may come with some risk, as exposure to the brighter beams may be harmful to the human eye. Thus, the emission time of the lasers may be shortened to minimize the risk, and the exposure time of the light receiving system may also be shortened to reduce ambient light.

Although increasing the brightness of the pattern and reducing the exposure time of the light receiving system may improve the detector's ability to acquire three-dimensional information, these modifications may also impair the camera's ability to capture a useful two-dimensional image. For instance, a two-dimensional image that is captured under a shortened exposure time is likely to be dark. Generally, a longer exposure time may be needed to capture a clearer two-dimensional image.

Thus, in summary, the optimal camera exposure time for detecting a three-dimensional projection pattern and the optimal camera exposure time for capturing a two-dimensional image may be very different. This makes it difficult to detect the three-dimensional projection pattern and to capture the two-dimensional image simultaneously, or within a relatively short period of time (e.g., less than one second), with the same camera.

Examples of the present disclosure provide a distance sensor that is capable of performing three-dimensional information acquisition (e.g., from a pattern of projected light) and two-dimensional image acquisition in qu8ick succession, with a single camera. In one example, the light source used to provide illumination for the two-dimensional image acquisition has the same wavelength as the light source that is used to project the pattern for three-dimensional information acquisition. This eliminates the need for a band-pass filter in the light receiving system of the distance sensor.

FIG. 1 is a block diagram illustrating an example distance sensor 100 of the present disclosure. The distance sensor 100 may be used to detect the distance d to an object 114. In one example, the distance sensor 100 shares many components of the distance sensors described in U.S. patent application Ser. Nos. 14/920,246, 15/149,323, and 15/149,429. For instance, in one example, the distance sensor comprises a camera (or other image capturing device) 102, a processor 104, a controller 106, and a pattern projector 108.

In one example, the camera 102 may be a still or video camera. The camera 102 may be capable of capturing three-dimensional distance data. For instance, the camera 102 may include a detector that is capable of detecting a pattern of light that is projected onto the object 114, where the projected light is of a wavelength that is substantially invisible to the human eye (e.g., infrared). The camera 102 may also be capable of capturing two-dimensional red, green, blue (RGB) images of the object 114. Thus, in one example, the camera 102 may be a red, green, blue infrared (RGBIR) camera. In this case, infrared light emitted for three-dimensional distance sensing may be input only to the pixels of the camera 102 with the IR filter, while other wavelengths of light can be recognized as color images by the pixel(s) on the RGB filter. Thus, the detector of the camera can detect red, green, blue and infrared simultaneously, can detect only infrared, or can detect only red, green, and blue. Because the three-dimensional distance sensing depends on the intensity of the projected pattern of light, and the two-dimensional imaging depends on external brightness, the optimal exposure time for the IR and RGB portions of the camera 102 will be different. The camera 102 may have a fish-eye lens, and may be configured to capture image data of a field of view of up to 180 degrees.

The camera 102 may send captured image data to the processor 104. The processor 104 may be configured to process the captured image data (e.g., three-dimensional distance data and two-dimensional image data) in order to calculate the distance to the object 114. For instance, the distance may be calculated in accordance with the methods described in U.S. patent application Ser. Nos. 14/920,246, 15/149,323, and 15/149,429.

The controller 106 may be configured to control operation of the other components of the distance sensor, e.g., the operations of the camera 102, the processor 104, and the pattern projector 108. For instance, the controller 106 may control the exposure time of the camera 102 (e.g., the duration for which the camera's shutter is open), and the timing with which the camera 102 captures images (including images of the object 114). As discussed in further detail below, the controller 106 may set two separate exposure durations for the camera 102: a first exposure duration during which an image of the object 114 is captured at the same time that the pattern projector 108 projects a pattern onto the object 114 (e.g., for three-dimensional distance sensing), and a second exposure duration during which an image of the object 114 is captured at a time when the pattern projector 108 does not project a pattern onto the object 114 (e.g., for two-dimensional image acquisition). In one example, the controller 106 may alternate between the first exposure duration and the second exposure duration.

The controller 106 may also control the duration for which the pattern projector 108 projects the pattern of light onto the object 114, as well as the timing with which the pattern projector 108 projects the pattern of light onto the object 114. For instance, the controller 106 may control the duration of pulses emitted by a light source of the pattern projector 108, as discussed in further detail below.

The pattern projector 108 may comprise various optics configured to project the pattern of light onto the object 114. For instance, the pattern projector 108 may include a laser light source, such as a vertical cavity surface emitting laser (VCSEL) 110 and a diffractive optical element (DOE) 112. The VCSEL 110 may be configured to emit beams of laser light under the direction of the controller 106 (e.g., where the controller 106 controls the duration of the laser pulses). The DOE 112 may be configured to split the beam of light projected by the VCSEL 110 into a plurality of beams of light. The plurality of beams of light may fan or spread out, so that each beam creates a distinct point (e.g., dot, dash, x, or the like) of light in the camera's field of view. Collectively, the distinct points of light created by the plurality of beams form a pattern. The distance to the object 114 may be calculated based on the appearance of the pattern on the object 114.

Figure 2:
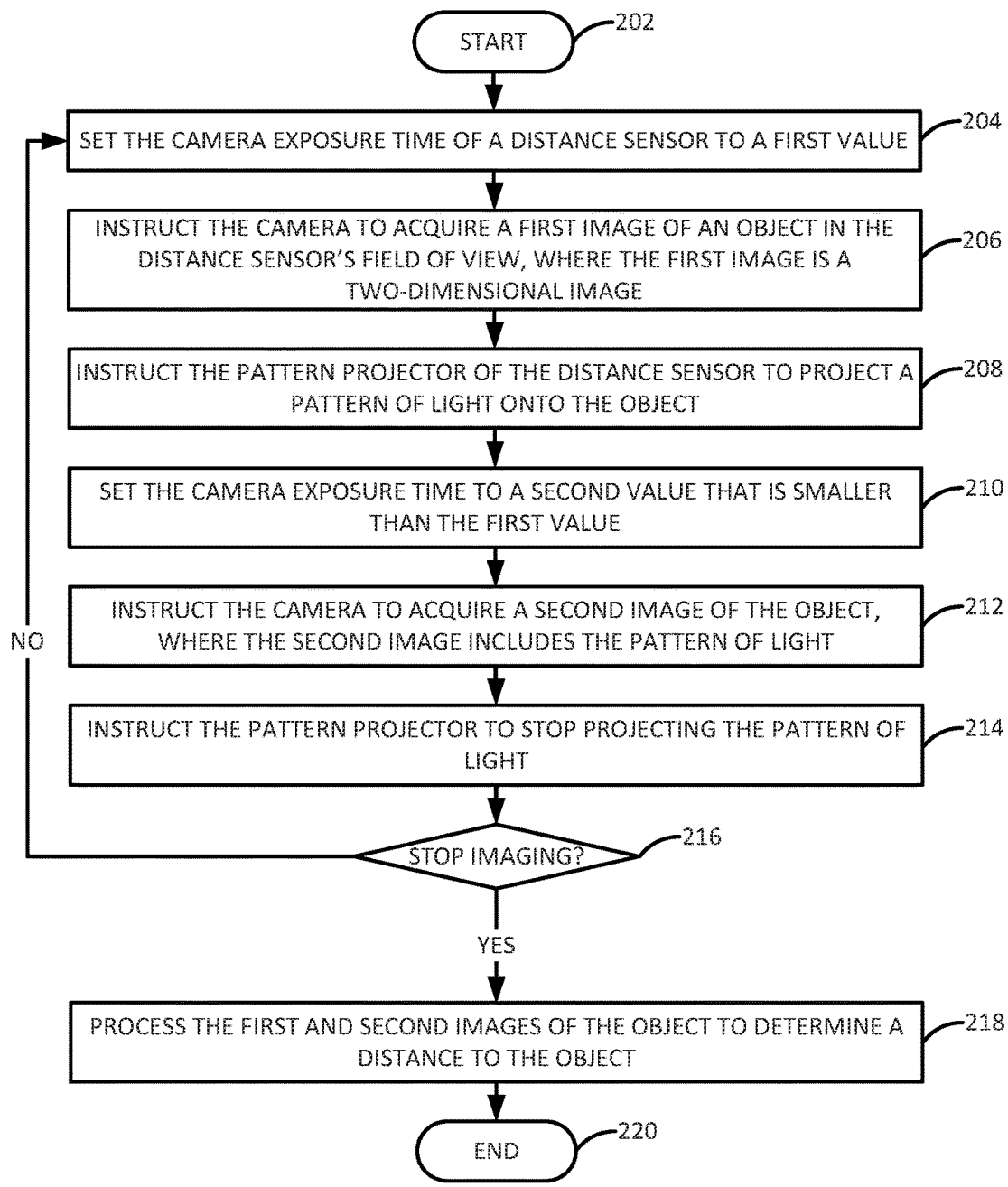
FIG. 2 is a flow diagram illustrating one example of a method for adjusting the camera exposure of a distance sensor for three-dimensional depth sensing and two-dimensional image capture, according to the present disclosure.

FIG. 2 is a flow diagram illustrating one example of a method 200 for adjusting the camera exposure of a distance sensor for three-dimensional depth sensing and two-dimensional image capture, according to the present disclosure. The method 200 may be performed, for example, by the processor 104 illustrated in FIG. 1. For the sake of example, the method 200 is described as being performed by a processing system.

The method 200 may begin in step 202. In step 204, the processing system may set the exposure time of a camera of a distance sensor to a first value. The first value may define a duration of the exposure (e.g., a first window of time for which the shutter of the camera is open to acquire image data).

In step 206, the processing system may instruct the camera to acquire a first image of an object in the distance sensor's field of view. In one example, the first image is a two dimensional image (which includes no data from projected patterns of light). In one example, the time of exposure for the acquisition of the first image is therefore equal to the first value.

In step 208, the processing system may instruct a pattern projector (e.g., a system of optics including a laser light source and diffractive optical element) of the distance sensor to project a pattern of light onto the object. In one example, the pattern of light may comprise light that is emitted in a wavelength that is substantially invisible to the human eye (e.g., infrared). In one example, the instructions sent to the pattern projector may include instructions regarding when to start projecting the pattern of light and for how long to project the pattern of light (e.g., the timing and duration of laser pulses).

In step 210, the processing system may set the exposure time of the camera to a second value. The second value may define a duration of the exposure (e.g., a second window of time for which the shutter of the camera is open to acquire image data). In one example, the second value is smaller than the first value.

In step 212, the processing system may instruct the camera to acquire a second image of the object, where the second image also includes the pattern of light projected onto the object by the pattern projector. In one example, the time of exposure for the acquisition of the second image is therefore equal to the second value.

In step 214 the processing system may instruct the pattern projector to stop projecting the pattern of light onto the object. For instance, the instructions sent to the pattern projector may instruct the pattern projector to turn off a laser.

In step 216, the processing system may determine whether to stop imaging the object. For instance, imaging of the object may stop if sufficient data (e.g., from the first and second images) has been acquired to calculate the distance to the object. If the processing system concludes in step 216 that imaging should not be stopped, then the method 200 may return to step 204 and proceed as described above to capture additional images of the object.

Alternatively, if the processing system concludes in step 216 that imaging should be stopped, then the method 200 may proceed to step 218. In step 218, the processing system may process the first and second images in order to determine the distance to the object. For instance, any of the methods described in in U.S. patent application Ser. Nos. 14/920,246, 15/149,323, and 15/149,429 may be used to calculate the distance. Alternatively, the processing system may send the first and second images to a remote processing system for the distance calculation.

The method 200 may end in step 220.

Figure 3:
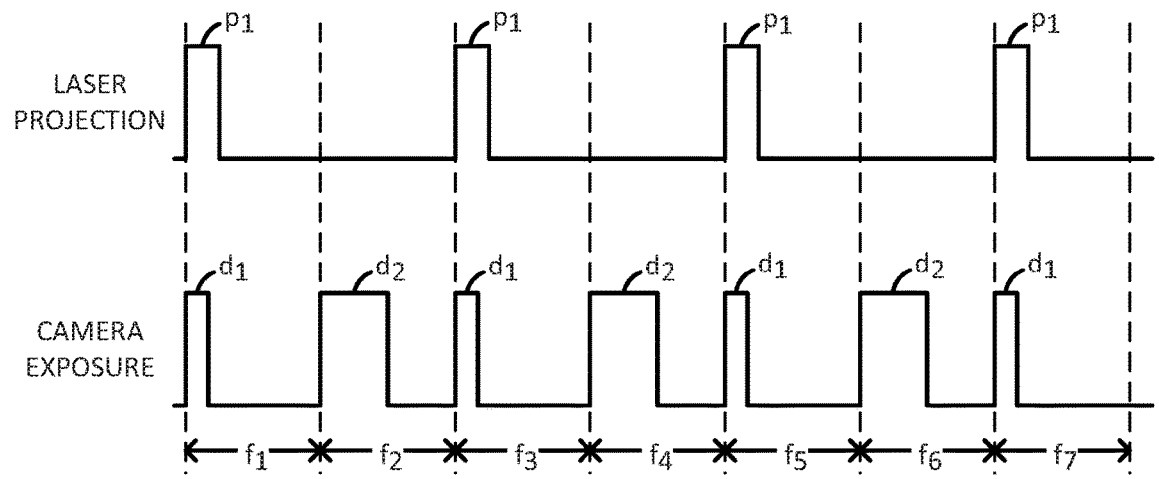
FIG. 3 is an example timing chart illustrating the relationship between the frame rate and exposure of a distance sensor camera, and the distance projection for three-dimensional distance measurement, where a single light source emits light during separate exposures for three-dimensional distance information and two-dimensional image acquisition, and where three-dimensional distance measurement and two-dimensional image acquisition alternate every other frame.

FIG. 3 is an example timing chart illustrating the relationship between the frame rate and exposure of a distance sensor camera, and the distance projection for three-dimensional distance measurement, where a single light source emits light during separate exposures for three-dimensional distance information and two-dimensional image acquisition, and where three-dimensional distance measurement and two-dimensional image acquisition alternate every other frame. For instance, the timing chart of FIG. 3 may illustrate the operations of the distance sensor 100 of FIG. 1.

In particular, FIG. 3 shows seven frames, $f_1$ -$f_7$, of the timing chart. In one example, a three-dimensional distance measurement and a two-dimensional image acquisition are performed alternately, every other frame. That is, during a first frame $f_1$, a first camera exposure of a first duration $d_1$ may be employed to acquire information for three-dimensional distance measurement. Then, during a subsequent second frame $f_2$, a second camera exposure of a second duration $d_2$ (longer than the duration of the first camera exposure, i.e., $d_2 > d_1$) may be employed to acquire a two-dimensional image. During a third frame $f_3$ and subsequent oddly numbered frames $f_5$, $f_7$, etc., the first duration $d_1$ is again employed for the exposure to acquire additional information for three-dimensional distance measurement. During a fourth frame $f_4$ and subsequent evenly numbered frames $f_6$, etc., the second duration $d_2$ is again employed for the exposure to acquire additional two-dimensional images, and so on.

In one example, a laser (or projection light source) pulse of a third, fixed duration $p_1$ may be emitted every other frame. In one example the third duration $p_1$ is greater than the first duration $d_1$, but less than the second duration $d_2$ (i.e., $d_1 < p_1 < d_2$). In one example, the laser pulse is emitted at the same time as each camera exposure of the first duration $d_1$ (e.g., every oddly numbered frame). Put another way, at the start of each oddly numbered frame, a laser pulse of duration $p_1$ is emitted, and the camera shutter is opened for a window of duration $d_1$. Thus, the laser pulse may be used to project a pattern from which the distance sensor may acquire information for three-dimensional distance measurement.

It can also be seen from FIG. 3 that each laser pulse of the third duration $p_1$ is associated with one camera exposure of the first duration $d_1$ and one camera exposure of the second duration $d_2$. That is, one camera exposure of the first duration $d_1$ and one camera exposure of the second duration $d_2$ (in that order) occur between each pair of laser pulses of the third duration $p_1$. Subsequently, the images acquired for three-dimensional distance measurement and the two-dimensional images may be processed separately and differently.

Figure 4:
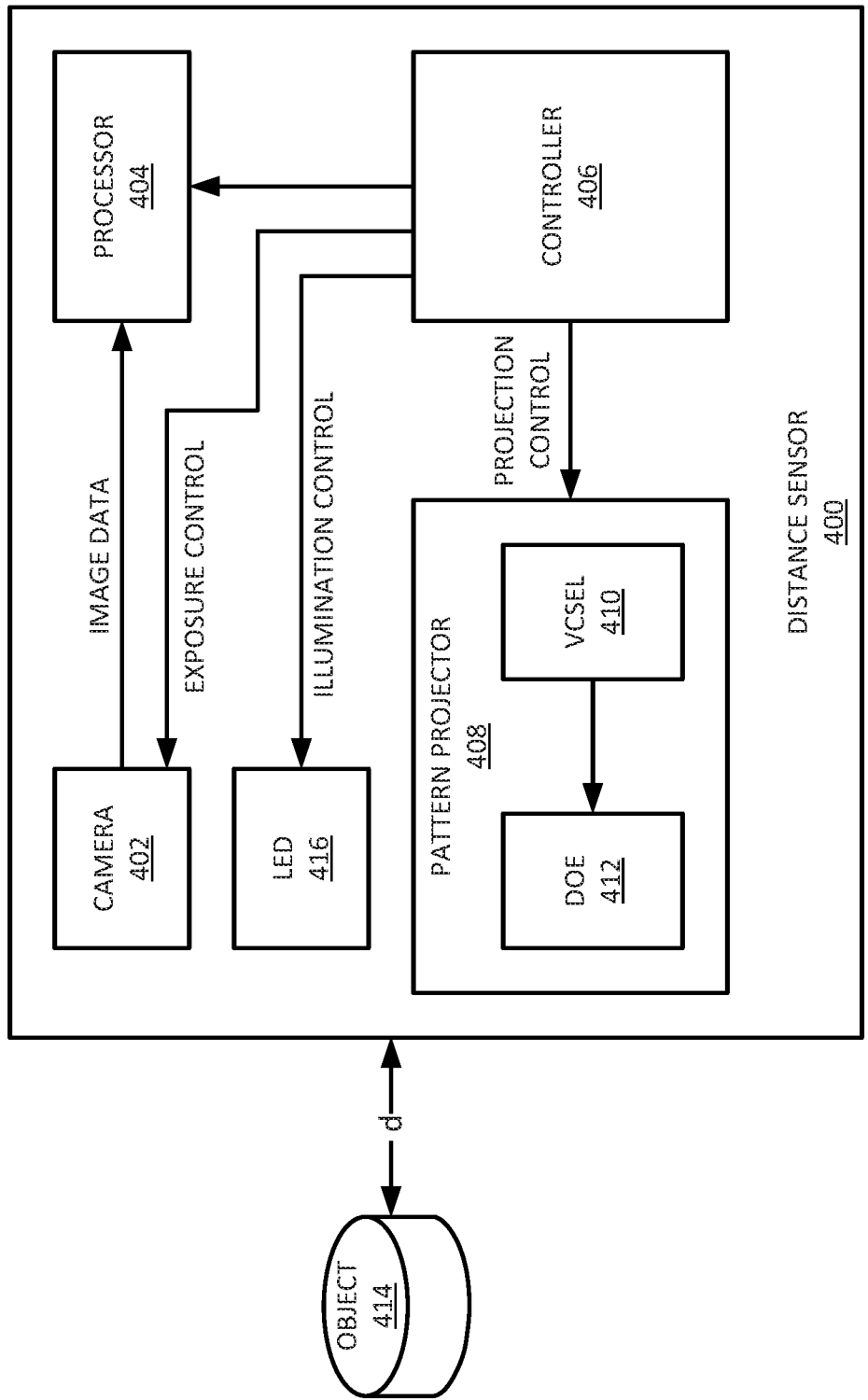
FIG. 4 is a block diagram illustrating an example distance sensor of the present disclosure.

FIG. 4 is a block diagram illustrating an example distance sensor 400 of the present disclosure. The distance sensor 400 may be used to detect the distance d to an object 414. In one example, the distance sensor 400 shares many components of the distance sensors described in U.S. patent application Ser. Nos. 14/920,246, 15/149,323, and 15/149,429. For instance, in one example, the distance sensor comprises a camera (or other image capturing device) 402, a processor 404, a controller 406, and a pattern projector 408. However, unlike the distance sensor 100 of FIG. 1, the distance sensor 400 additionally includes a light emitting diode (LED) 416 or other type of illumination means that emits light in a wavelength that is visible to the human eye (e.g., white). Alternatively, the emitted wavelength of the LED 416 may be the same as the wavelength of the VCSEL 410.

In one example, the camera 402 may be a still or video camera. The camera 402 may be capable of capturing three-dimensional distance data. For instance, the camera 402 may include a detector that is capable of detecting a pattern of light that is projected onto the object 414, where the projected light is of a wavelength that is substantially invisible to the human eye (e.g., infrared). The camera 402 may also be capable of capturing two-dimensional red, green, blue (RGB) images of the object 414. Thus, in one example, the camera 402 may be a red, green, blue infrared (RGBIR) camera. In this case, infrared light emitted for three-dimensional distance sensing may be input only to the pixel of the camera 402 with the IR filter, while other wavelengths of light can be recognized as color images by the pixel(s) on the RGB filter. Because the three-dimensional distance sensing depends on the intensity of the projected pattern of light, and the two-dimensional imaging depends on external brightness, the optimal exposure time for the IR and RGB portions of the camera 402 will be different. The camera 402 may have a fish-eye lens, and may be configured to capture image data of a field of view of up to 180 degrees.

The camera 402 may send captured image data to the processor 404. The processor 404 may be configured to process the captured image data (e.g., three-dimensional distance data and two-dimensional image data) in order to calculate the distance to the object 414. For instance, the distance may be calculated in accordance with the methods described in U.S. patent application Ser. Nos. 14/920,246, 15/149,323, and 15/149,429.

The controller 406 may be configured to control operation of the other components of the distance sensor, e.g., the operations of the camera 402, the processor 404, the pattern projector 408, and the LED 416. For instance, the controller 406 may control the exposure time of the camera 402 (e.g., the duration for which the camera's shutter is open), and the timing with which the camera 402 captures images (including images of the object 414). As discussed in further detail below, the controller 406 may set two separate exposure durations for the camera 402: a first exposure duration during which an image of the object 414 is captured at the same time that the pattern projector 408 projects a pattern onto the object 414 (e.g., for three-dimensional distance sensing), and a second exposure duration during which an image of the object 414 is captured at a time when the pattern projector 408 does not project a pattern onto the object 414, but at which the LED 416 is illuminating the object 414 (e.g., for two-dimensional image acquisition). In one example, the controller 406 may alternate between the first exposure duration and the second exposure duration.

The controller 406 may also control the duration for which the pattern projector 408 projects the pattern of light onto the object 414, as well as the timing with which the pattern projector 408 projects the pattern of light onto the object 414. For instance, the controller 406 may control the duration of pulses emitted by a light source of the pattern projector 408, as discussed in further detail below.

The controller 406 may also control the duration for which the LED 416 illuminates the object 414, as well as the timing with which the LED 416 illuminates the object 414. For instance, the controller 406 may control the duration of pulses emitted by the LED 416, as discussed in further detail below.

The pattern projector 408 may comprise various optics configured to project the pattern of light onto the object 414. For instance, the pattern projector 408 may include a laser light source, such as a vertical cavity surface emitting laser (VCSEL) 410 and a diffractive optical element (DOE) 412. The VCSEL 410 may be configured to emit beams of laser light under the direction of the controller 406 (e.g., where the controller 406 controls the duration of the laser pulses). The DOE 412 may be configured to split the beam of light projected by the VCSEL 410 into a plurality of beams of light. The plurality of beams of light may fan or spread out, so that each beam creates a distinct point (e.g., dot, dash, x, or the like) of light in the camera's field of view. Collectively, the distinct points of light created by the plurality of beams form a pattern. The distance to the object 414 may be calculated based on the appearance of the pattern on the object 414.

The LED 416 may comprise one or more light emitting diodes, or other light sources, capable of emitting light in a wavelength that is visible to the human eye (e.g., white) under the direction of the controller 406 (e.g., where the controller 406 controls the duration of the LED pulses). Alternatively, the emitted wavelength of the LED 416 may be the same as the wavelength of the VCSEL 410. The illumination provided by the LED 416 may be used to acquire a two-dimensional image of the object 414, as discussed in further detail below.

Figure 5:
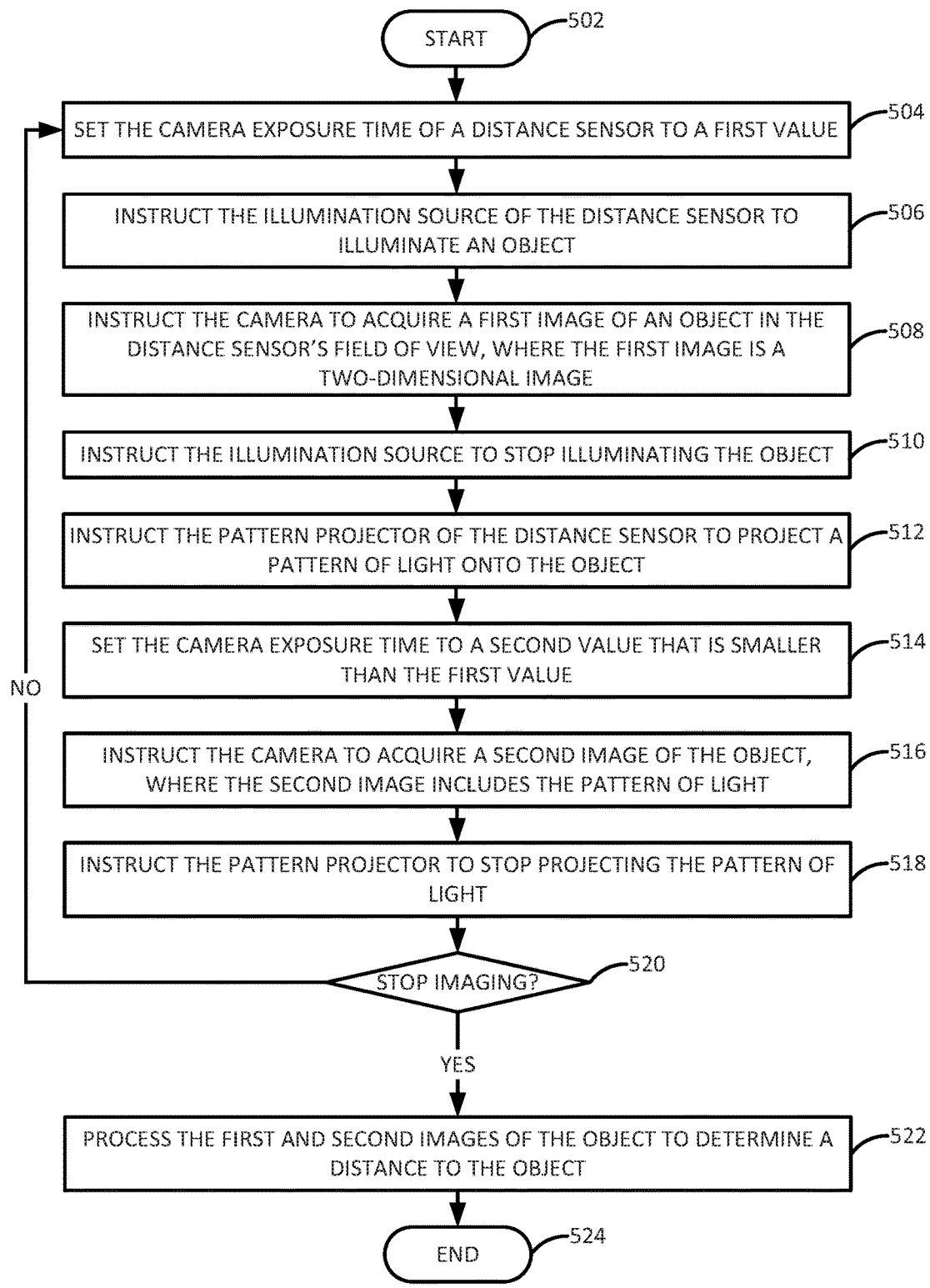
FIG. 5 is a flow diagram illustrating one example of a method for adjusting the camera exposure of a distance sensor for three-dimensional depth sensing and two-dimensional image capture, according to the present disclosure.

FIG. 5 is a flow diagram illustrating one example of a method 500 for adjusting the camera exposure of a distance sensor for three-dimensional depth sensing and two-dimensional image capture, according to the present disclosure. The method 500 may be performed, for example, by the processor 404 illustrated in FIG. 4. For the sake of example, the method 500 is described as being performed by a processing system.

The method 500 may begin in step 502. In step 504, the processing system may set the exposure time of a camera of a distance sensor to a first value. The first value may define a duration of the exposure (e.g., a first window of time for which the shutter of the camera is open to acquire image data).

In step 506, the processing system may instruct an illumination source (e.g., an LED) of the distance sensor to illuminate an object in the distance sensor's field of view. In one example, the light emitted to illuminate the object may comprise light in a wavelength that is visible to the human eye. Alternatively, the emitted wavelength of the illumination source may be the same as the wavelength of the distance sensor's pattern projector. In one example, the instructions sent to the illumination source may include instructions regarding when to start emitting the light and for how long emit the light (e.g., the timing and duration of LED pulses).

In step 508, the processing system may instruct the camera to acquire a first image of the object. In one example, the first image is a two dimensional image (which includes no data from projected patterns of light). In one example, the time of exposure for the acquisition of the first image is therefore equal to the first value.

In step 510, the processing system may instruct the illumination source to stop illuminating the object. For instance, the instructions sent to the illumination source may instruct the pattern projector to turn off an LED.

In step 512, the processing system may instruct a pattern projector (e.g., a system of optics including a laser light source and diffractive optical element) of the distance sensor to project a pattern of light onto the object. In one example, the pattern of light may comprise light that is emitted in a wavelength that is substantially invisible to the human eye (e.g., infrared). In one example, the instructions sent to the pattern projector may include instructions regarding when to start projecting the pattern of light and for how long to project the pattern of light (e.g., the timing and duration of laser pulses).

In step 514, the processing system may set the exposure time of the camera to a second value. The second value may define a duration of the exposure (e.g., a second window of time for which the shutter of the camera is open to acquire image data). In one example, the second value is smaller than the first value.

In step 516, the processing system may instruct the camera to acquire a second image of the object, where the second image also includes the pattern of light projected onto the object by the pattern projector. In one example, the time of exposure for the acquisition of the second image is therefore equal to the second value.

In step 518 the processing system may instruct the pattern projector to stop projecting the pattern of light onto the object. For instance, the instructions sent to the pattern projector may instruct the pattern projector to turn off a laser.

In step 520, the processing system may determine whether to stop imaging the object. For instance, imaging of the object may stop if sufficient data (e.g., from the first and second images) has been acquired to calculate the distance to the object. If the processing system concludes in step 520 that imaging should not be stopped, then the method 500 may return to step 504 and proceed as described above to capture additional images of the object.

Alternatively, if the processing system concludes in step 520 that imaging should be stopped, then the method 500 may proceed to step 522. In step 522, the processing system may process the first and second images in order to determine the distance to the object. For instance, any of the methods described in in U.S. patent application Ser. Nos. 14/920,246, 15/149,323, and 15/149,429 may be used to calculate the distance. Alternatively, the processing system may send the first and second images to a remote processing system for the distance calculation.

The method 500 may end in step 524.

Figure 6:
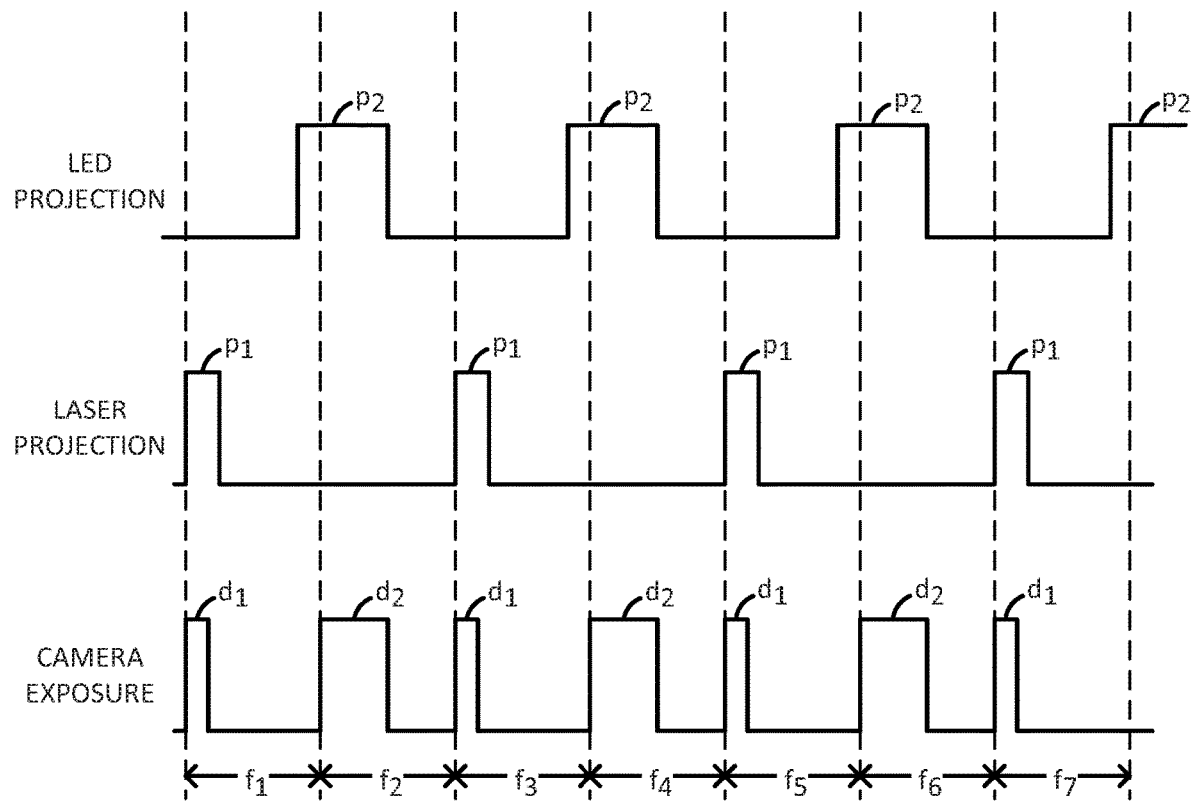
FIG. 6 is an example timing chart illustrating the relationship between the frame rate and exposure of a distance sensor camera, the distance projection for three-dimensional distance measurement, and the light emission for two-dimensional image acquisition, where a first light source emits light at or near the time of three-dimensional data acquisition and second, separate light source emits light at the time of two-dimensional image acquisition, and three-dimensional distance measurement and two-dimensional image acquisition alternate every other frame.

FIG. 6 is an example timing chart illustrating the relationship between the frame rate and exposure of a distance sensor camera (e.g., a video camera), the distance projection for three-dimensional distance measurement, and the light emission for two-dimensional image acquisition, where a first light source emits light at or near the time of three-dimensional data acquisition and second, separate light source emits light at the time of two-dimensional image acquisition, and three-dimensional distance measurement and two-dimensional image acquisition alternate every other frame.

In particular, FIG. 6 shows seven frames, $f_1$ -$f_7$, of the timing chart. As in the example of FIG. 3, a three-dimensional distance measurement and a two-dimensional image acquisition are performed alternately, every other frame. That is, during a first frame $f_1$, a first camera exposure of a first duration $d_1$ may be employed to acquire information for three-dimensional distance measurement. Then, during a subsequent second frame $f_2$, a second camera exposure of a second duration $d_2$ (longer than the duration of the first camera exposure, i.e., $d_2 > d_1$) may be employed to acquire a two-dimensional image. During a third frame $f_3$ and subsequent oddly numbered frames $f_5$, $f_7$, etc., the first duration $d_1$ is again employed for the exposure to acquire additional information for three-dimensional distance measurement. During a fourth frame $f_4$ and subsequent evenly numbered frames $f_6$, etc., the second duration $d_2$ is again employed for the exposure to acquire additional two-dimensional images, and so on.

As in the example of FIG. 3, a laser (or projection light source) pulse of a third, fixed duration $p_1$ may be emitted every other frame. In one example the third duration $p_1$ is greater than the first duration $d_1$, but less than the second duration $d_2$ (i.e., $d_1 < p_1 < d_2$). In one example, the laser pulse is emitted at the same time each camera exposure of the first duration $d_1$ begins (e.g., each time every oddly numbered frame begins). Put another way, at the start of each oddly numbered frame, a laser pulse of duration $p_1$ is emitted, and the camera shutter is opened for a window of duration $d_1$. Thus, the laser pulse may be used to project a pattern from which the distance sensor may acquire information for three-dimensional distance measurement.

It can also be seen from FIG. 6 that each laser pulse of the third duration $p_1$ is associated with one camera exposure of the first duration $d_1$ and one camera exposure of the second duration $d_2$. That is, one camera exposure of the first duration $d_1$ and one camera exposure of the second duration $d_2$ (in that order) occur between each pair of laser pulses of the third duration $p_1$.

In one example, a light emitting diode (LED) (or illumination light source) pulse of a fourth, fixed duration $p_2$ may also be emitted, alternately with the laser pulses of the third duration $p_1$. In one example the fourth duration $p_2$ is the greatest of the first duration $d_1$, the second duration $d_2$, and the third duration $p_1$ (i.e., $d_1 < p_1 < d_2 < p_2$). In one example, the LED pulses overlap frames; that is, the LED pulses may begin at the end of (e.g., more than halfway through) one frame and may end near the middle of the subsequent frame. For instance, referring to FIG. 6, an LED pulse of fourth duration $p_2$ may begin in frame $f_1$, after the laser pulse of the third duration $p_1$ has ended. The same LED pulse may end in the middle of the subsequent frame $f_2$ (during which no laser pulse may occur). In one example, the LED pulse is emitted just before each camera exposure of the second duration $d_2$ (e.g., just before every even numbered frame begins). Put another way, just before the start of each even numbered frame, an LED pulse of duration $p_2$ is emitted, and the camera shutter is opened for a window of duration $d_2$ which ends in the middle of the (even numbered) frame. Thus, the LED pulse may be used to provide illumination with which the distance sensor may acquire a two-dimensional image of an object.

It can also be seen from FIG. 6 that each LED pulse of the fourth duration $p_2$ is associated with one camera exposure of the second duration $d_2$ and one camera exposure of the first duration $d_1$. That is, one camera exposure of the second duration $d_2$ and one camera exposure of the first duration $d_1$ (in that order) occur between each pair of LED pulses of the fourth duration $p_2$. Subsequently, the images acquired for three-dimensional distance measurement and the two-dimensional images may be processed separately and differently.

In another example, steps 508 and 516 of FIG. 5 can be modified so that the processing system instructs the camera to capture a first plurality of (e.g., n) images and a second plurality of (e.g., n) images, respectively. Thus, during each pulse or emission of the illumination source or the pattern projection, a plurality of images may be captured.

Figure 7:
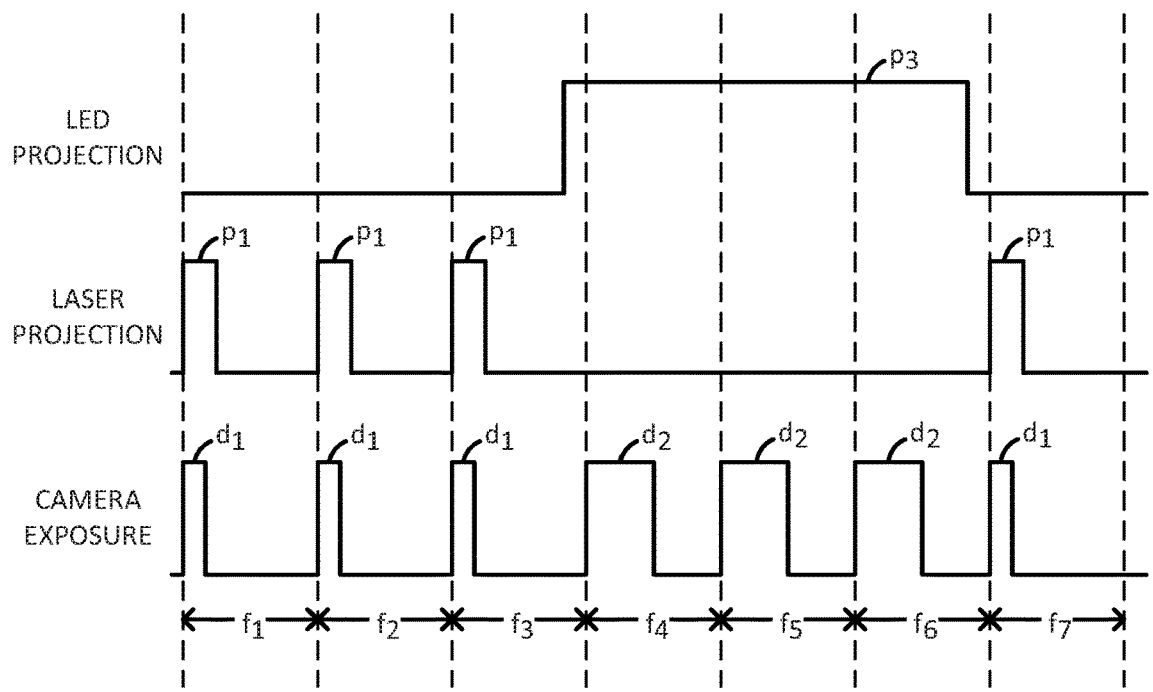
FIG. 7 is an example timing chart illustrating the relationship between the frame rate and exposure of a distance sensor camera, the distance projection for three-dimensional distance measurement, and the light emission for two-dimensional image acquisition, where a first light source emits light at or near the time of three-dimensional data acquisition and second, separate light source emits light at the time of two-dimensional image acquisition, and three-dimensional distance measurement and two-dimensional image acquisition alternate every predetermined number of frames.

For instance, FIG. 7 is an example timing chart illustrating the relationship between the frame rate and exposure of a distance sensor camera (e.g., a video camera), the distance projection for three-dimensional distance measurement, and the light emission for two-dimensional image acquisition, where a first light source emits light at or near the time of three-dimensional data acquisition and second, separate light source emits light at the time of two-dimensional image acquisition, and three-dimensional distance measurement and two-dimensional image acquisition alternate every predetermined number of frames.

In particular, FIG. 7 shows seven frames, $f_1$-$f_7$, of the timing chart. Unlike the examples of FIG. 3 and FIG. 6, where a three-dimensional distance measurement and a two-dimensional image acquisition alternate every other frame, in FIG. 7, a three-dimensional distance measurement and a two-dimensional image acquisition alternate every predetermined (and configurable) number n of frames. In the particular example illustrated in FIG. 7, n=3. That is, during a first three frames $f_1$, $f_2$, and $f_3$, a first camera exposure of a first duration $d_1$ may be employed to acquire information for three-dimensional distance measurement. Then, during a subsequent three frames frame $f_4$, $f_5$, and $f_6$, a second camera exposure of a second duration $d_2$ (longer than the duration of the first camera exposure, i.e., $d_2 > d_1$) may be employed to acquire a two-dimensional image. During a subsequent three frames starting with $f_7$, the first duration $d_1$ is again employed for the exposure to acquire additional information for three-dimensional distance measurement, and so on.

As in the example of FIG. 3, a laser (or projection light source) pulse of a third, fixed duration $p_1$ may be emitted at the start of each frame in which three-dimensional distance measurement data is acquired. In one example the third duration $p_1$ is greater than the first duration $d_1$, but less than the second duration $d_2$ (i.e., $d_1 < p_1 < d_2$). In one example, the laser pulse is emitted at the same time each camera exposure of the first duration $d_1$ begins (e.g., each time a frame in a set of n subsequent frames begins). Put another way, at the start of each frame in a set of n frames designated for three-dimensional data acquisition, a laser pulse of duration p1 is emitted, and the camera shutter is opened for a window of duration $d_1$. Thus, the laser pulse may be used to project a pattern from which the distance sensor may acquire information for three-dimensional distance measurement.

It can also be seen from FIG. 7 that each laser pulse of the third duration $p_1$ is associated with one camera exposure of the first duration $d_1$. That is, one camera exposure of the first duration $d_1$ occurs between each pair of laser pulses of the third duration $p_1$.

In one example, a light emitting diode (LED) (or illumination light source) pulse of a fifth, fixed duration $p_3$ may also be emitted at the start of each set of n frames in which a two-dimensional image is acquired. In one example the fifth duration $p_3$ is the greatest of the first duration $d_1$, the second duration $d_2$, the third duration $p_1$, and the fourth duration $p_2$ (i.e., $d_1 < p_1 < d_2 < p_2 < p_3$). In one example, the LED pulses overlap frames; that is, the LED pulses may begin at the end of (e.g., more than halfway through) one frame and may end near the middle of a frame n frames later. For instance, referring to FIG. 7, an LED pulse of fifth duration $p_3$ may begin in frame $f_3$, after a laser pulse of the third duration $p_1$ has ended. The same LED pulse may end in the middle of the frame n frames later, i.e., frame $f_6$. In one example, the LED pulse is emitted just before the first camera exposure of the second duration $d_2$ (e.g., where n camera exposures of the second duration $d_2$ occur in a row). Put another way, just before the start of the first frame of n subsequent frames designated for two-dimensional image acquisition, an LED pulse of duration $p_3$ is emitted, and the camera shutter is opened three times in a row for a window of duration $d_2$ (which ends in the middle of each frame of the n frames) during the duration $d_3$. Thus, the LED pulse may be used to provide illumination with which the distance sensor may acquire a two-dimensional image of an object.

It can also be seen from FIG. 7 that each LED pulse of the fifth duration $p_3$ is associated with n camera exposures of the second duration $d_2$. That is, n camera exposures of the second duration $d_1$ occur during every LED pulse of the fifth duration $p_3$. Subsequently, the images acquired for three-dimensional distance measurement and the two-dimensional images may be processed separately and differently.

Figure 8:
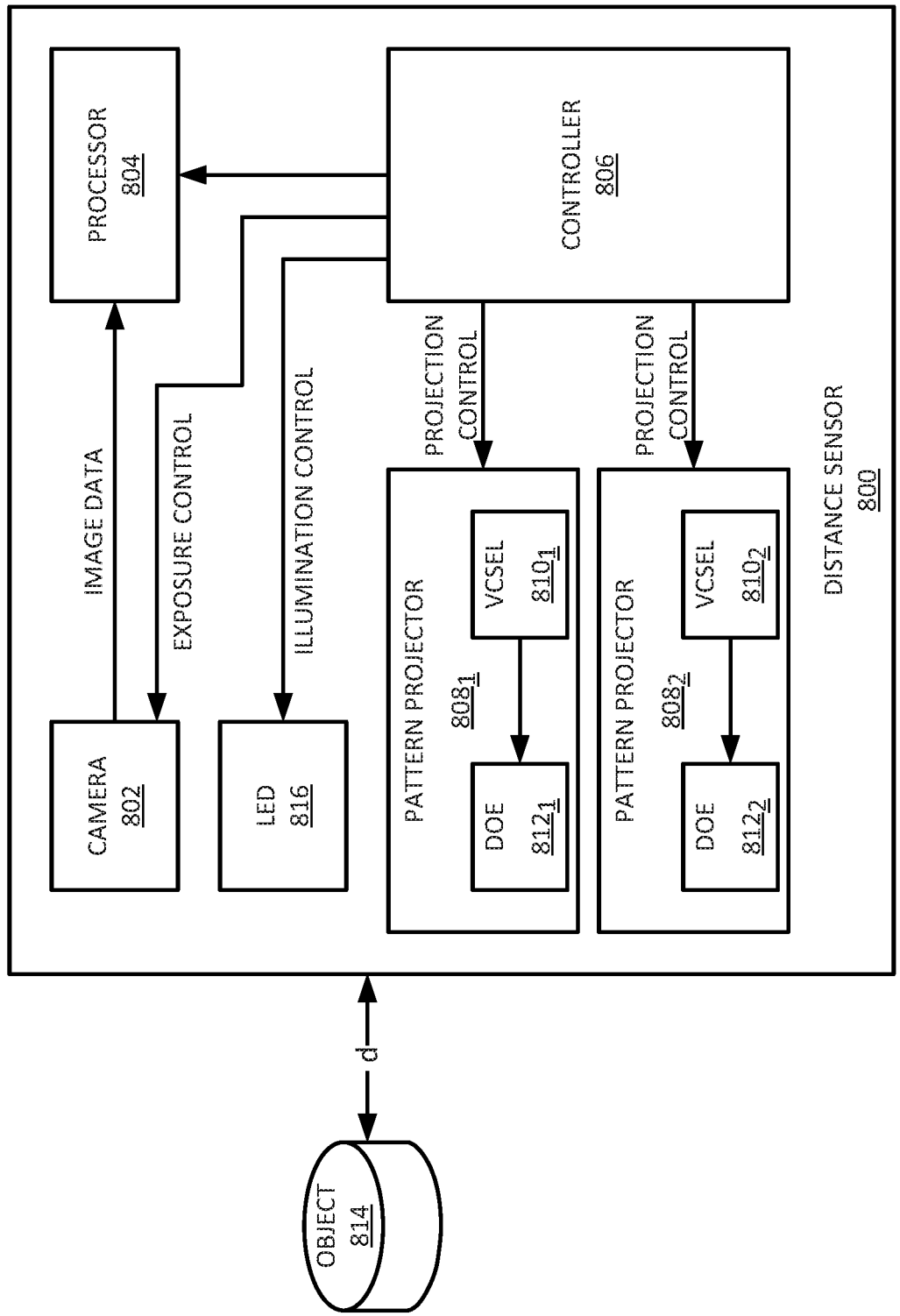
FIG. 8 is a block diagram illustrating an example distance sensor of the present disclosure.

FIG. 8 is a block diagram illustrating an example distance sensor 800 of the present disclosure. The distance sensor 800 may be used to detect the distance d to an object 814. In one example, the distance sensor 800 shares many components of the distance sensors described in U.S. patent application Ser. Nos. 14/920,246, 15/149,323, and 15/149,429. For instance, in one example, the distance sensor comprises a camera (or other image capturing device) 802, a processor 804, a controller 806, and a plurality of pattern projectors $808_1$-$808_2$ (hereinafter individually referred to as a "pattern projector 808" or collectively referred to as "pattern projectors 808"). Thus, unlike the distance sensors 100 of FIGS. 1 and 4, the distance sensor 800 comprises more than one pattern projector.

In one example, the camera 802 may be a still or video camera. The camera 802 may be capable of capturing three-dimensional distance data. For instance, the camera 802 may include a detector that is capable of detecting a pattern of light that is projected onto the object 814, where the projected light is of a wavelength that is substantially invisible to the human eye (e.g., infrared). The camera 802 may also be capable of capturing two-dimensional red, green, blue (RGB) images of the object 814. Thus, in one example, the camera 802 may be a red, green, blue infrared (RGBIR) camera. In this case, infrared light emitted for three-dimensional distance sensing may be input only to the pixel of the camera 802 with the IR filter, while other wavelengths of light can be recognized as color images by the pixel(s) on the RGB filter. Because the three-dimensional distance sensing depends on the intensity of the projected pattern of light, and the two-dimensional imaging depends on external brightness, the optimal exposure time for the IR and RGB portions of the camera 802 will be different. The camera 802 may have a fish-eye lens, and may be configured to capture image data of a field of view of up to 180 degrees.

The camera 802 may send captured image data to the processor 804. The processor 804 may be configured to process the captured image data (e.g., three-dimensional distance data and two-dimensional image data) in order to calculate the distance to the object 814. For instance, the distance may be calculated in accordance with the methods described in U.S. patent application Ser. Nos. 14/920,246, 15/149,323, and 15/149,429.

The controller 806 may be configured to control operation of the other components of the distance sensor, e.g., the operations of the camera 802, the processor 804, the pattern projectors 808, and the LED 816. For instance, the controller 806 may control the exposure time of the camera 802 (e.g., the duration for which the camera's shutter is open), and the timing with which the camera 802 captures images (including images of the object 814). As discussed in further detail below, the controller 806 may set two separate exposure durations for the camera 802: a first exposure duration during which an image of the object 814 is captured at the same time that at least one of the pattern projectors 808 projects a pattern onto the object 814 (e.g., for three-dimensional distance sensing), and a second exposure duration during which an image of the object 814 is captured at a time when the pattern projectors 808 do not project a pattern onto the object 814, but at which the LED 816 is illuminating the object 814 (e.g., for two-dimensional image acquisition). In one example, the controller 806 may alternate between the first exposure duration and the second exposure duration.

The controller 806 may also control the duration for which the pattern projectors 808 project the pattern of light onto the object 814, as well as the timing with which the pattern projectors 808 project the pattern of light onto the object 814. For instance, the controller 806 may control the duration of pulses emitted by a light source of the pattern projectors 808, as discussed in further detail below. In one particular example, the controller 806 may control the pattern projectors 808 to project the pattern of light into separate portions of the camera's field of view at separate times.

The controller 806 may also control the duration for which the LED 816 illuminates the object 814, as well as the timing with which the LED 816 illuminates the object 814. For instance, the controller 806 may control the duration of pulses emitted by the LED 816, as discussed in further detail below.

The pattern projectors 808 may comprise various optics configured to project the pattern of light onto the object 814. For instance, each pattern projector 808 may include a respective laser light source, such as a respective vertical cavity surface emitting laser (VCSEL) $810_1$ or $810_2$ (hereinafter also referred to individually as a "VCSEL 810" or collectively as "VCSELs 810") and a respective diffractive optical element (DOE) $812_1$ or $812_2$ (hereinafter referred to individually as a "DOE 812" or collectively as "DOEs 812"). The VCSELs 810 may be configured to emit beams of laser light under the direction of the controller 806 (e.g., where the controller 806 controls the duration of the laser pulses). The DOEs 812 may be configured to split the beams of light projected by the respective VCSELs 810 into respective pluralities of beams of light. The pluralities of beams of light may fan or spread out, so that each beam creates a distinct point (e.g., dot, dash, x, or the like) of light in the camera's field of view. Collectively, the distinct points of light created by the pluralities of beams form respective patterns. The distance to the object 814 may be calculated based on the appearance of the patterns on the object 814.

The LED 816 may comprise one or more light emitting diodes, or other light sources, capable of emitting light in a wavelength that is visible to the human eye (e.g., white) under the direction of the controller 806 (e.g., where the controller 806 controls the duration of the LED pulses). Alternatively, the emitted wavelength of the LED 816 may be the same as the wavelength of the VCSEL 810. The illumination provided by the LED 816 may be used to acquire a two-dimensional image of the object 814, as discussed in further detail below.

Figure 9:
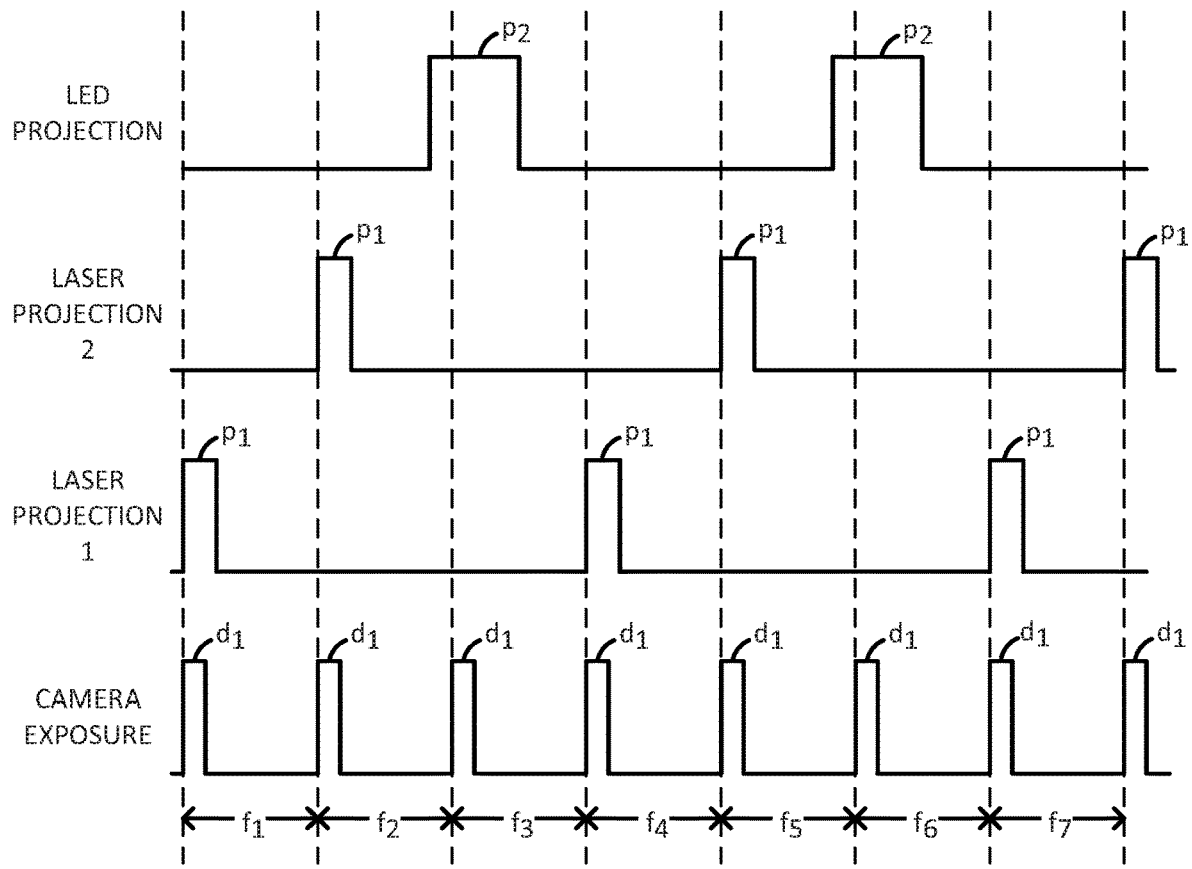
FIG. 9 is an example timing chart illustrating the relationship between the frame rate and exposure of a distance sensor camera (e.g., a video camera), the distance projection for three-dimensional distance measurement, and the light emission for two-dimensional image acquisition, where two light projection systems (e.g., used for three-dimensional distance data acquisition) are used and the exposure durations for three-dimensional data acquisition and two-dimensional image capture are the same.

FIG. 9 is an example timing chart illustrating the relationship between the frame rate and exposure of a distance sensor camera (e.g., a video camera), the distance projection for three-dimensional distance measurement, and the light emission for two-dimensional image acquisition, where two light projection systems (e.g., used for three-dimensional distance data acquisition) are used and the exposure durations for three-dimensional data acquisition and two-dimensional image capture are the same.

In particular, FIG. 9 shows seven frames, $f_1$-$f_7$, of the timing chart. In one example, two three-dimensional distance measurement and one two-dimensional image acquisition are performed alternately, every three frame. That is, during a first frame $f_1$, a first camera exposure of a first duration $d_1$ may be employed to acquire information for three-dimensional distance measurement.

During a subsequent second frame $f_2$, a second camera exposure of the first duration $d_1$ may be employed to acquire information for three-dimensional distance measurement. Then, during a subsequent third frame $f_3$, a third camera exposure of the first duration $d_1$ may be employed to acquire a two-dimensional image. During a fourth frame $f_4$ and a fifth frame $f_5$, the first duration $d_1$ is again employed for the exposure to acquire additional information for three-dimensional distance measurement. During a sixth frame $f_6$, the first duration $d_1$ is again employed for the exposure to acquire additional two-dimensional images, and so on.

As illustrated in FIG. 9, a first laser (or projection light source) pulse of a third, fixed duration pi may be emitted every three frames. In one example the third duration $p_1$ is greater than the first duration $d_1$ (i.e., $d_1 < p_1$). In one example, the first laser pulse is emitted at the beginning of every third frame. Put another way, at the start of every third frame, a first laser pulse of duration p1 is emitted, and the camera shutter is opened for a window of duration $d_1$. Thus, the first laser pulse may be used to project a pattern from which the distance sensor may acquire information for three-dimensional distance measurement.

Similarly, a second laser (or projection light source) pulse of the third, fixed duration pi may also be emitted every three frames. In one example, the second laser pulse is emitted at the beginning of every third frame, but one frame after each first laser pulse. Put another way, at the start of every frame after a frame in which the first laser pulse occurs, a second laser pulse of duration p1 is emitted, and the camera shutter is opened for a window of duration $d_1$. Thus, the second laser pulse may be used to project a pattern from which the distance sensor may acquire information for three-dimensional distance measurement.

It can also be seen from FIG. 9 that each laser pulse (whether it is a first laser pulse or a second laser pulse) of the third duration pi is associated with three camera exposures of the first duration $d_1$. That is, three camera exposures of the first duration $d_1$ occur between each pair of (first or second) laser pulses of the third duration $p_1$.

In one example, a light emitting diode (LED) (or illumination light source) pulse of a fourth, fixed duration $p_2$ may also be emitted, after each second laser pulse of the third duration $p_1$. In one example the fourth duration $p_2$ is the greatest of the first duration $d_1$ and the third duration $p_1$ (i.e., $d_1 < p_1 < p_2$). In one example, the LED pulses overlap frames; that is, the LED pulses may begin at the end of (e.g., more than halfway through) one frame and may end near the middle of the subsequent frame. For instance, referring to FIG. 9, an LED pulse of fourth duration $p_2$ may begin in frame $f_2$, after the second laser pulse of the third duration $p_1$ has ended. The same LED pulse may end in the middle of the subsequent frame $f_3$ (during which no laser pulse may occur). In one example, the LED pulse is emitted just before each camera exposure during which two-dimensional image acquisition is performed (e.g., just before every third frame begins). Put another way, just before the start of every third frame, an LED pulse of duration $p_2$ is emitted, and the camera shutter is opened for a window of duration $d_1$ which ends in the middle of the subsequent frame. Thus, the LED pulse may be used to provide illumination with which the distance sensor may acquire a two-dimensional image of an object.

It can also be seen from FIG. 9 that each LED pulse of the fourth duration $p_2$ is associated with three camera exposures of the first duration $d_1$. That is, three camera exposures of the first duration $d_1$ occur between each pair of LED pulses of the fourth duration $p_2$. Subsequently, the images acquired for three-dimensional distance measurement and the two-dimensional images may be processed separately and differently.

Figure 10:
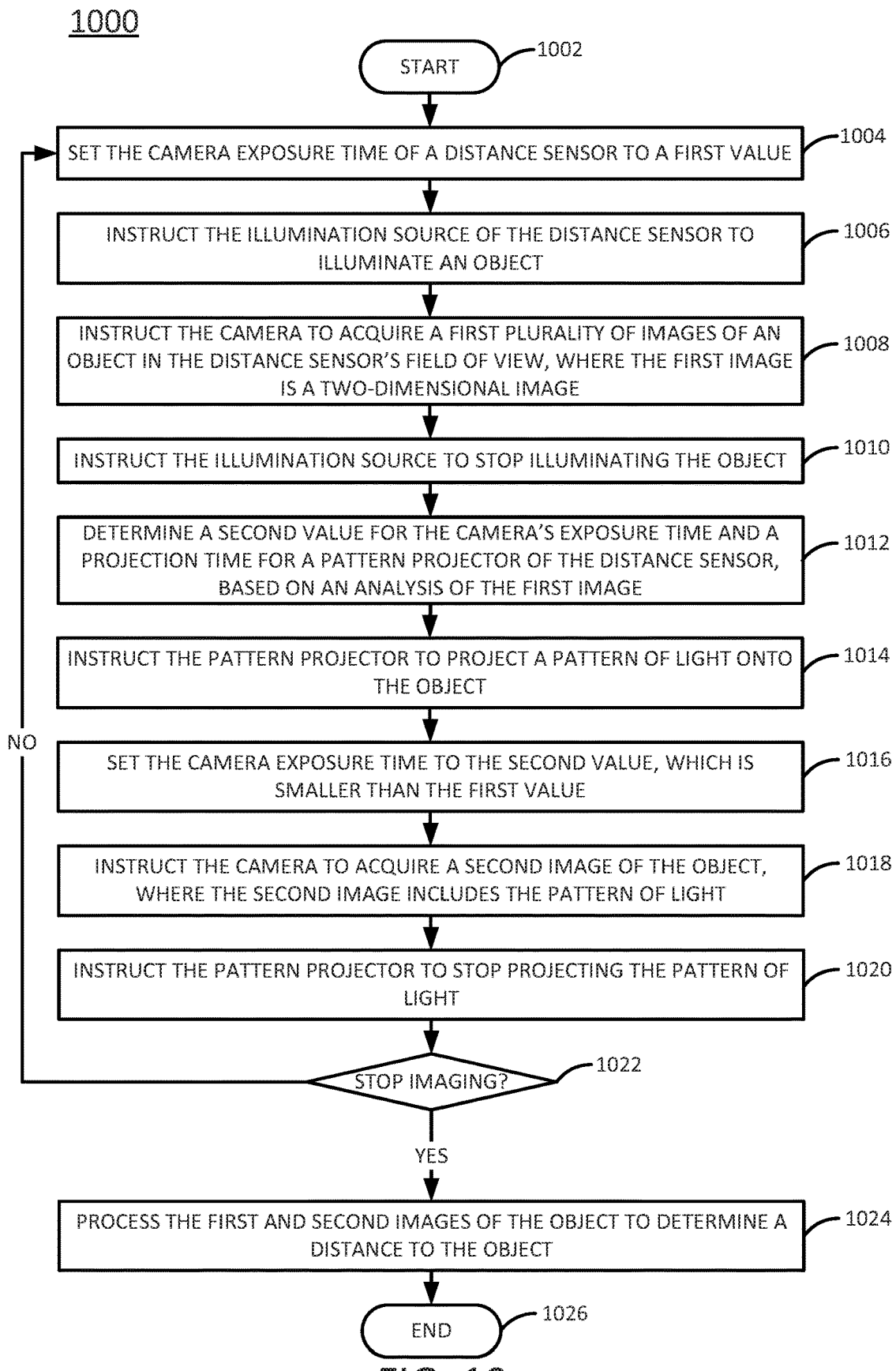
FIG. 10 is a flow diagram illustrating one example of a method for adjusting the camera exposure of a distance sensor for three-dimensional depth sensing and two-dimensional image capture, according to the present disclosure.

FIG. 10 is a flow diagram illustrating one example of a method 1000 for adjusting the camera exposure of a distance sensor for three-dimensional depth sensing and two-dimensional image capture, according to the present disclosure. The method 1000 may be performed, for example, by any of the processors 104, 404, or 804 illustrated in FIGS. 1, 4, and 8. However, in this case, the processor additionally performs an analysis of two-dimensional image data captured by the camera and feeds this analysis back into the controller to control the exposure control and illumination control. For the sake of example, the method 1000 is described as being performed by a processing system.

The method 1000 may begin in step 1002. In step 1004, the processing system may set the exposure time of a camera of a distance sensor to a first value. The first value may define a duration of the exposure (e.g., a first window of time for which the shutter of the camera is open to acquire image data).

In step 1006, the processing system may instruct an illumination source (e.g., an LED) of the distance sensor to illuminate an object in the distance sensor's field of view. In one example, the light emitted to illuminate the object may comprise light in a wavelength that is visible to the human eye (e.g., white). In one example, the instructions sent to the illumination source may include instructions regarding when to start emitting the light and for how long emit the light (e.g., the timing and duration of LED pulses).

In step 1008, the processing system may instruct the camera to acquire a first image of the object. In one example, the first image is a two dimensional image (which includes no data from projected patterns of light). In one example, the time of exposure for the acquisition of the first image is therefore equal to the first value.

In step 1010, the processing system may instruct the illumination source to stop illuminating the object. For instance, the instructions sent to the illumination source may instruct the pattern projector to turn off an LED.

In step 1012, the processing system may determine a second value for the exposure time of the camera and a projection time of a pattern projector of the distance sensor (e.g., a system of optics including a laser light source and diffractive optical element), based on an analysis of the first image of the object.

In step 1014, the processing system may instruct the pattern projector of the distance sensor to project a pattern of light onto the object. In one example, the pattern of light may comprise light that is emitted in a wavelength that is substantially invisible to the human eye (e.g., infrared). In one example, the instructions sent to the pattern projector may include instructions regarding when to start projecting the pattern of light and for how long to project the pattern of light (e.g., the timing and duration of laser pulses).

In step 1016, the processing system may set the exposure time of the camera to the second value. The second value may define a duration of the exposure (e.g., a second window of time for which the shutter of the camera is open to acquire image data). In one example, the second value is smaller than the first value.

In step 1018, the processing system may instruct the camera to acquire a second image of the object, where the second image also includes the pattern of light projected onto the object by the pattern projector. In one example, the time of exposure for the acquisition of the second image is therefore equal to the second value.

In step 1020 the processing system may instruct the pattern projector to stop projecting the pattern of light onto the object. For instance, the instructions sent to the pattern projector may instruct the pattern projector to turn off a laser.

In step 1022, the processing system may determine whether to stop imaging the object. For instance, imaging of the object may stop if sufficient data (e.g., from the first and second images) has been acquired to calculate the distance to the object. If the processing system concludes in step 1022 that imaging should not be stopped, then the method 1000 may return to step 1004 and proceed as described above to capture additional images of the object.

Alternatively, if the processing system concludes in step 1022 that imaging should be stopped, then the method 1000 may proceed to step 1024. In step 1024, the processing system may process the first and second images in order to determine the distance to the object. For instance, any of the methods described in in U.S. patent application Ser. Nos. 14/920,246, 15/149,323, and 15/149,429 may be used to calculate the distance. Alternatively, the processing system may send the first and second images to a remote processing system for the distance calculation.

The method 1000 may end in step 1026.

Figure 11:
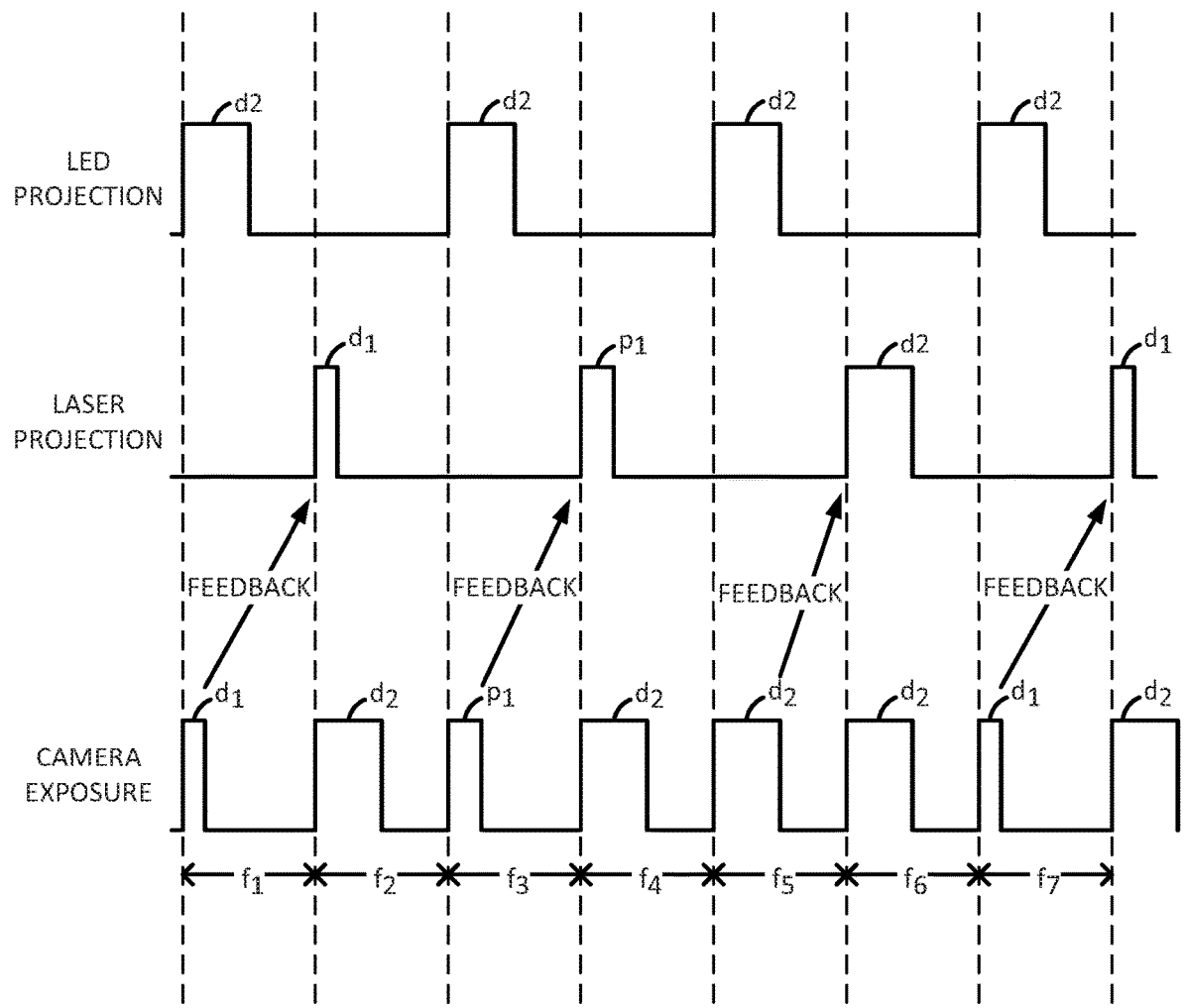
FIG. 11 is an example timing chart illustrating the relationship between the frame rate and exposure of a distance sensor camera (e.g., a video camera), the distance projection for three-dimensional distance measurement, and the light emission for two-dimensional image acquisition, where information about shutter speed at the time of two-dimensional image acquisition is fed back to the timing for three-dimensional distance data acquisition.

FIG. 11 is an example timing chart illustrating the relationship between the frame rate and exposure of a distance sensor camera (e.g., a video camera), the distance projection for three-dimensional distance measurement, and the light emission for two-dimensional image acquisition, where information about shutter speed at the time of two-dimensional image acquisition is fed back to the timing for three-dimensional distance data acquisition. That is, the exposure time of the camera and the time of projection for a pattern of light during three-dimensional distance data acquisition may be based on an analysis of the object from a two-dimensional image of the object.

It should be noted that although not explicitly specified, some of the blocks, functions, or operations of the methods 200, 500, and 1000 described above may include storing, displaying and/or outputting for a particular application. In other words, any data, records, fields, and/or intermediate results discussed in the methods 200, 500, and 1000 can be stored, displayed, and/or outputted to another device depending on the particular application. Furthermore, blocks, functions, or operations in FIGS. 2, 5, and 10 that recite a determining operation, or involve a decision, do not imply that both branches of the determining operation are practiced. In other words, one of the branches of the determining operation may not be performed, depending on the results of the determining operation.

Figure 12:
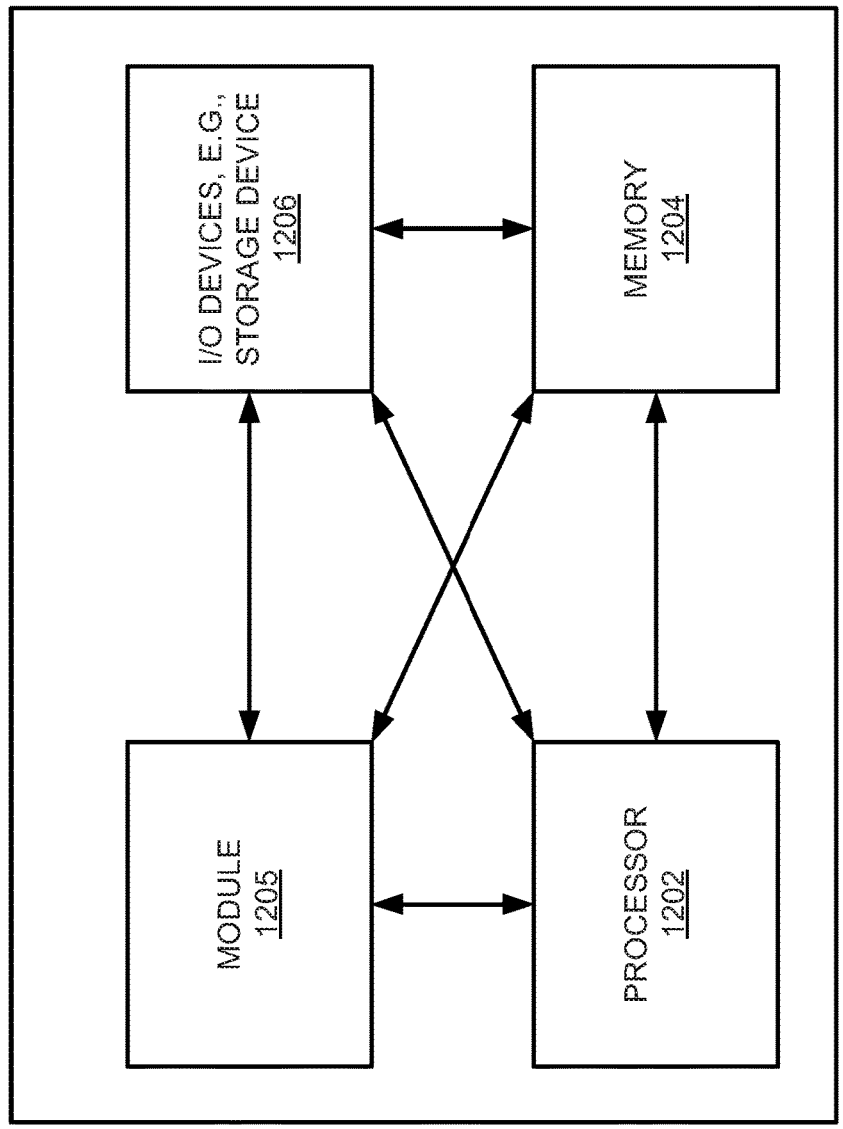
FIG. 12 depicts a high-level block diagram of an example electronic device for calculating the distance from a sensor to an object.

FIG. 12 depicts a high-level block diagram of an example electronic device 1200 for calculating the distance from a sensor to an object. As such, the electronic device 1200 may be implemented as a processor of an electronic device or system, such as a distance sensor (e.g., as processor 104, 404, or 804 in FIGS. 1, 4, and 8).

As depicted in FIG. 12, the electronic device 1200 comprises a hardware processor element 1202, e.g., a central processing unit (CPU), a microprocessor, or a multi-core processor, a memory 1204, e.g., random access memory (RAM) and/or read only memory (ROM), a module 1205 for calculating the distance from a sensor to an object, and various input/output devices 1206, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 1200 may employ a plurality of processor elements. Furthermore, although one electronic device 1200 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 1200 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 1205 for calculating the distance from a sensor to an object, e.g., machine readable instructions can be loaded into memory 1204 and executed by hardware processor element 1202 to implement the blocks, functions or operations as discussed above in connection with the methods 200, 500, and 1000. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 1205 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:
1. A method, comprising:
  setting, by a processing system of a distance sensor, an exposure time of a camera of the distance sensor to a first value;
  instructing, by the processing system, the camera to acquire a first image of an object in a field of view of the camera, where the first image is acquired while the exposure time is set to the first value;

instructing, by the processing system, a pattern projector of the distance sensor to project a pattern of light onto the object;

setting, by the processing system, the exposure time of the camera to a second value that is different than the first value, wherein the second value is determined based at least in part on an analysis of the first image; and instructing, by the processing system, the camera to acquire a second image of the object, where the second image includes the pattern of light, and where the second image is acquired while the exposure time is set to the second value.

2. The method of claim 1, wherein the second value is smaller than the first value.

3. The method of claim 2, wherein the first image is a two-dimensional red, green, blue image.

4. The method of claim 3, wherein the second image is an infrared image.

5. The method of claim 1, wherein the pattern of light comprises a pattern of light whose wavelength is invisible to a human eye.

6. The method of claim 5, wherein the wavelength is infrared.

7. The method of claim 5, wherein the camera comprises a detector that detects wavelengths of light that are visible to the human eye as well as the wavelength that is invisible to the human eye.

8. The method of claim 7, wherein the camera is a red, green, blue infrared camera.

9. The method of claim 1, further comprising:
instructing, by the processing system and prior to the instructing the camera to acquire the first image, an illumination source of the distance sensor to illuminate the object; and
instructing, by the processing system and prior to the instructing the pattern projector to project the pattern of light, the illumination source to stop illuminating the object.

10. The method of claim 9, wherein the illumination source emits light in a wavelength that is invisible to a human eye.

11. The method of claim 10, wherein the illumination source is an infrared light emitting diode.

12. The method of claim 1, wherein the first image is one of a first plurality of images acquired by the camera while the exposure time is set to the first value, and wherein the second image is one of a second plurality of images acquired by the camera while the exposure time is set to the second value.

13. The method of claim 1, wherein the pattern projector is a first pattern projector of a plurality of pattern projectors of the distance sensor, and wherein each pattern projector of the plurality of pattern projectors is configured to project a respective pattern of light into a different area in the field of view.

14. The method of claim 1, further comprising:
calculating, by the processing system, a distance from the distance sensor to the object based on an analysis of the first image and the second image.

15. A non-transitory machine-readable storage medium encoded with instructions executable by a processor of a distance sensor, wherein, when executed, the instructions cause the processor to perform operations, the operations comprising:

setting an exposure time of a camera of the distance sensor to a first value;

instructing the camera to acquire a first image of an object in a field of view of the camera, where the first image is acquired while the exposure time is set to the first value;

instructing a pattern projector of the distance sensor to project a pattern of light onto the object;

setting the exposure time of the camera to a second value that is different than the first value, wherein the second value is determined based at least in part on an analysis of the first image;

instructing the camera to acquire a second image of the object, where the second image includes the pattern of light, and where the second image is acquired while the exposure time is set to the second value; and calculating a distance from the distance sensor to the object based on an analysis of the first image and the second image.

16. A distance sensor, comprising:

a pattern projector configured to project a pattern of light onto an object; a camera;

a controller configured to set an exposure time of the camera to a first value when the pattern projector is not projecting the pattern of light onto the object and to set the exposure time of the camera to a second value that is different than the first value when the pattern projector is projecting the pattern of light onto the object, wherein the second value is determined based at least in part on an analysis of a first image captured when the exposure time is set to the first value; and a processor configured to calculate a distance from the distance sensor to the object based on the first image a second image captured when the exposure time is set to the second value.

17. The distance sensor of claim 16, wherein the pattern projector comprises:

an infrared laser source configured to emit a beam of infrared light; and a diffractive optical element configured to split the beam of infrared light into a plurality of beams of infrared light, wherein each beam of the plurality of beams of infrared light creates one projection artifact in a field of view of the camera.

18. The distance sensor of claim 17, wherein the camera is a red, green, blue infrared camera.

19. The distance sensor of claim 16, further comprising:

an infrared light emitting diode controlled by the controller to illuminate the object when the camera captures the first image.

20. The method of claim 1, wherein a time for which the pattern projector projects the pattern of light onto the object is also determined based at least in part on the analysis of the first image.

* * * * *

UNITED STATES PATENT AND TRADEMARK OFFICE
CERTIFICATE OF CORRECTION

PATENT NO. : 10,931,883 B2
APPLICATION NO. : 16/353859
DATED : February 23, 2021
INVENTOR(S) : Akiteru Kimura Page 1 of 1

It is certified that error appears in the above-identified patent and that said Letters Patent is hereby corrected as shown below:

In the Specification

Column 15, Lines 3-13, delete, "During a subsequent second frame $f_2$, a second camera exposure of the first duration $d_1$ may be employed to acquire information for three-dimensional distance measurement. Then, during a subsequent third frame $f_3$, a third camera exposure of the first duration $d_1$ may be employed to acquire a two-dimensional image. During a fourth frame $f_4$ and a fifth frame $f_5$, the first duration $d_1$ is again employed for the exposure to acquire additional information for three-dimensional distance measurement. During a sixth frame $f_6$, the first duration $d_1$ is again employed for the exposure to acquire additional two-dimensional images, and so on." and insert
--During a subsequent second frame $f_2$, a second camera exposure of the first duration $d_1$ may be employed to acquire information for three-dimensional distance measurement. Then, during a subsequent third frame $f_3$, a third camera exposure of the first duration $d_1$ may be employed to acquire a two-dimensional image. During a fourth frame $f_4$ and a fifth frame $f_5$, the first duration $d_1$ is again employed for the exposure to acquire additional information for three-dimensional distance measurement. During a sixth frame $f_6$, the first duration $d_1$ is again employed for the exposure to acquire additional two-dimensional images, and so on.-- on Column 15, Line 2 as a continuation of the same paragraph.

Column 15, Line 15, delete "pi" and insert -- $p_1$ --.

Column 15, Line 16, delete "p1is" and insert -- $p_1$ is --.

Column 15, Line 26, delete "pi" and insert -- $p_1$ --.

Column 15, Line 38, delete "pi" and insert -- $p_1$ --.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*